(12) United States Patent
Herzig

(10) Patent No.: US 8,669,340 B2
(45) Date of Patent: Mar. 11, 2014

(54) EMULSIONS OF ORGANOPOLYSILOXANES HAVING ACIDIC AND BASIC GROUPS AND THE PRODUCTION THEREOF

(75) Inventor: Christian Herzig, Waging (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/818,195

(22) PCT Filed: Aug. 10, 2011

(86) PCT No.: PCT/EP2011/063758
§ 371 (c)(1),
(2), (4) Date: Feb. 21, 2013

(87) PCT Pub. No.: WO2012/025383
PCT Pub. Date: Mar. 1, 2012

(65) Prior Publication Data
US 2013/0158193 A1    Jun. 20, 2013

(30) Foreign Application Priority Data
Aug. 24, 2010  (DE) .......................... 10 2010 039 704

(51) Int. Cl.
*C08G 77/392*    (2006.01)

(52) U.S. Cl.
USPC ............... 528/38; 528/28; 524/236; 524/284

(58) Field of Classification Search
None
See application file for complete search history.

(56) References Cited

U.S. PATENT DOCUMENTS

| 4,513,127 A | 4/1985 | Jacobine |
| 4,622,348 A * | 11/1986 | Jacobine et al. ................. 522/27 |
| 5,221,724 A | 6/1993 | Li et al. |
| 5,326,796 A | 7/1994 | LeCacheur et al. |
| 8,058,463 B2 * | 11/2011 | Herzog et al. ................. 556/413 |

FOREIGN PATENT DOCUMENTS

EP    0185476 A1    6/1986

* cited by examiner

Primary Examiner — Marc Zimmer
(74) Attorney, Agent, or Firm — Brooks Kushman P.C.

(57) ABSTRACT

Organopolysiloxanes containing both acidic and basic groups are prepared by reacting oganopolysiloxanes with primary or secondary amino groups with a stoichiometric deficiency of isocyanates containing sulfonyl-group-containing electron withdrawings groups in the presence of acidic or basic moderators.

24 Claims, No Drawings

EMULSIONS OF ORGANOPOLYSILOXANES HAVING ACIDIC AND BASIC GROUPS AND THE PRODUCTION THEREOF

CROSS-REFERENCE TO RELATED APPLICATIONS

This application is the U.S. national phase of PCT Appln. No. PCT/EP2011/063758 filed Aug. 10, 2011 which claims priority to German application 10 2010 039 704.0 filed Aug. 24, 2010, the disclosures of which are incorporated in their entirety by reference herein.

BACKGROUND OF THE INVENTION

1. Field of the Invention

The invention relates to emulsions of organopolysiloxanes having acidic and basic groups and the production thereof. Furthermore, the invention relates to organopolysiloxanes having acidic and basic groups and to the production thereof.

2. Description of the Related Art

U.S. Pat. No. 4,513,127 describes a free-radically curable composition comprising a monomer having at least one free-radically polymerizable acrylate group and a monomer-soluble accelerator which has sulfamido groups of the formula $RSO_2NHCOX$ which are bonded to an n-valent group "G" which is compatible with the crosslinkable monomer. If the crosslinkable monomers are silicone acrylates, then "G" is also advantageously a polysiloxane in order to improve the solubility of the accelerator in the monomer to be polymerized by free-radical means. Various methods are given for producing these accelerators. Thus, the production can take place by reacting an aromatic sulfonyl isocyanate with a silane that is reactive towards isocyanate, with subsequent polymerization to give the polysiloxane, or by reacting the aromatic sulfonyl isocyanate with an organic compound that is reactive towards isocyanate and simultaneously unsaturated, which can be converted to the corresponding siloxane polymer by subsequent hydrosilylation with a hydrogen siloxane. The bifunctional substituent "X" can be oxygen, sulfur, the peroxo group or an amino group, where X when "G" is an organopolysiloxane is bonded to this "G" via a divalent hydrocarbon radical.

U.S. Pat. No. 5,326,796 describes low molecular weight tosyl urethanes which can be obtained by reaction of multi-hydroxy(polyether) compounds with tosyl isocyanate. These urethanes are used as substitute for formaldehyde-based resins in fingernail varnishes.

SUMMARY OF THE INVENTION

It was an object of the invention to provide a method for producing emulsions of organopolysiloxanes which contain acidic and basic groups, with which organopolysiloxanes are produced which can be emulsified easily and, in so doing, emulsions of high viscosity to elastomer-like organopolysiloxanes can be obtained.

These and other objects are achieved by the invention.

DETAILED DESCRIPTION OF THE PREFERRED EMBODIMENTS

The invention thus provides a method for producing emulsions of organopolysiloxanes having basic and acidic groups, by, in the first step:
reacting organopolysiloxanes (1) having primary and/or secondary amino groups (—NH—)
with isocyanates (2) of the formula X—N=C=O,
where X is an electron-withdrawing group,
in the presence of acidic moderators (3), preferably carboxylic acids, or basic moderators (3), with the proviso that
0.01-0.9 mol, preferably 0.1-0.8 mol, preferably 0.1-0.5 mol, of isocyanate group in (2) are used per mole of amino group (—NH—) in (1) and that
0.1-10 mol of acidic moderators (3) are used per mole of amino group (—NH—) in (1) or
0.1-10 mol of basic moderators (3) are used per mole of amino group (—NH—) in (1),
where, if amines are used as basic moderators, only tertiary amines are used,
and, in the second step:
emulsifying the (4a) reaction products from (1) and (2) obtained from the first step,
which contain acidic or basic moderators (3), with optionally (5) emulsifiers and
optionally (6) organic solvents in (7) water,
where emulsions of (4b) organopolysiloxanes that are liquid at 25° C. and 1020 hPa and have a viscosity of from 100 Pa.s to 1,000,000 Pa.s (25° C.) or elastomer-like organopolysiloxanes are obtained and where the organopolysiloxanes have, as basic groups, primary and/or secondary amino groups (—NH—) and, as acidic groups, those of the formula X—NH—CO—N=, where X is an electron-withdrawing group.

The invention further provides a method for producing organopolysiloxanes having basic and acidic groups, by, in the first step:
reacting organopolysiloxanes (1) having primary and/or secondary amino groups (—NH—)
with isocyanates (2) of the formula X—N=C=O,
where X is an electron-withdrawing group,
in the presence of acidic moderators (3), preferably carboxylic acids,
or basic moderators (3), with the proviso that 0.01-0.9 mol, preferably 0.1-0.8 mol, preferably 0.1-0.5 mol, of isocyanate group in (2) are used per mole of amino group (—NH—) in (1)
and that
0.1-10 mol of acidic moderators (3) are used per mole of amino group (—NH—) in (1) or
0.1-10 mol of basic moderators (3) are used per mole of amino group (—NH—) in (1),
where, if amines are used as basic moderators, only tertiary amines are used,
where, as (4a) reaction products from (1) and (2), organopolysiloxanes are obtained which have, as basic groups, primary and/or secondary amino groups (—NH—) and, as acidic groups, those of the formula X—NH—CO—N=, where X is an electron-withdrawing group, and which contain acidic or basic moderators (3).

The invention further provides emulsions of organopolysiloxanes having basic and acidic groups, obtainable by, in the first step:
reacting organopolysiloxanes (1) having primary and/or secondary amino groups (—NH—)
with isocyanates (2) of the formula X—N=C=O,
where X is an electron-withdrawing group,
in the presence of acidic moderators (3), preferably carboxylic acids, or basic moderators (3),
with the proviso that
0.01-0.9 mol, preferably 0.1-0.8 mol, preferably 0.1-0.5 mol, of isocyanate group in (2) are used per mole of amino group (—NH—) in (1)

and that 0.1-10 mol of acidic moderators (3) are used per mole of amine group (—NH—) in (1) or 0.1-10 mol of basic moderators (3) are used per mole of amino group (—NH—) in (1), where, if amines are used as basic moderators, only tertiary amines are used, and, in the second step:

emulsifying the (4a) reaction products from (1) and (2) obtained from the first step, which contain acidic or basic moderators (3), with optionally (5) emulsifiers and optionally (6) organic solvents in (7) water, where emulsions of (4b) organopolysiloxanes that are liquid at 25° C. and 1020 hPa and have a viscosity of from 100 Pa.s to 1,000,000 Pa.s (25° C.) or elastomer-like organopolysiloxanes are obtained, where the organopolysiloxanes have, as basic groups, primary and/or secondary amino groups (—NH—) and, as acidic groups, those of the formula X—NH—CO—N=, where X is an electron-withdrawing group.

The invention further provides organopolysiloxanes having basic and acidic groups, obtainable by, in the first step:

reacting organopolysiloxanes (1) having primary and/or secondary amino groups (—NH—)

with isocyanates (2) of the formula X—N=C=O, where X is an electron-withdrawing group, in the presence of acidic moderators (3), or basic moderators (3), with the proviso that 0.01-0.9 mol, preferably 0.1-0.8 mol, preferably 0.1-0.5 mol, of isocyanate group in (2) are used per mole of amino group (—NH—) in (1) and that 0.1-10 mol of acidic moderators (3) are used per mole of amino group (—NH—) in (1) or 0.1-10 mol of basic moderators (3) are used per mole of amino group (—NH—) in (1), where, if amines are used as basic moderators, only tertiary amines are used, where, as (4a) reaction products from (1) and (2), organopolysiloxanes are obtained which have, as basic groups, primary and/or secondary amino groups (—NH—) and, as acidic groups, those of the formula X—NH—CO—N=, where X is an electron-withdrawing group, and which contain acidic or basic moderators (3).

Preferably, the primary and/or secondary amino groups in the organopolysiloxanes (1) are Si—C bonded groups A of the general formula

    (I)

where $R^2$ is a divalent linear or branched hydrocarbon radical having 1 to 18 carbon atoms, $R^3$ is a hydrogen atom or a monovalent hydrocarbon radical having 1 to 18 carbon atoms, preferably a $C_1$-$C_4$-alkyl radical, or an acyl radical, preferably a hydrogen atom, $R^4$ is a divalent hydrocarbon radical having 1 to 6 carbon atoms, and g is 0, 1, 2, 3 or 4, preferably 0, 1 or 2, particularly preferably 1 or 2.

Preferably, the organopolysiloxanes (1) are those of the general formula

    (II)

where

A has the meaning given above for it,

R is a monovalent hydrocarbon radical having 1 to 18 carbon atoms,

R' is a hydrogen atom or a monovalent hydrocarbon radical having 1 to 18 carbon atoms, preferably a $C_1$-$C_4$-alkyl radical, a is 0 or 1, b is 0, 1, 2 or 3, c is 0 or 1, with the proviso that the sum a+b+c is ≤3 and that the organopolysiloxanes contain at least one radical A per molecule.

Preferably, the organopolysiloxanes (1) used are those of the general formula

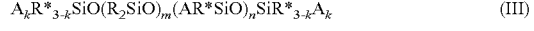    (III)

where

A has the meaning given above for it,

R* is R or a radical of the formula —OR',

R is a monovalent hydrocarbon radical having 1 to 18 carbon atoms,

R' is a hydrogen atom or a monovalent hydrocarbon radical having 1 to 18 carbon atoms, preferably a $C_1$-$C_4$-alkyl radical, k is 0 or 1, m is an integer from 1 to 1000, preferably 10 to 500, preferably 20 to 400, and n is 0 or an integer from 1 to 50, preferably 1 to 20, preferably 1 to 10, with the proviso that the organopolysiloxanes contain at least one radical A per molecule.

Examples of monovalent hydrocarbon radicals R having 1 to 18 carbon atoms are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as cyclopentyl, cyclohexyl, cycloheptyl and methylcyclohexyl radicals; alkenyl radicals such as the vinyl, 5-hexenyl, cyclohexenyl, 1-propenyl, allyl, 3-butenyl and 4-pentenyl radicals; alkynyl radicals such as the ethynyl, propargyl and 1-propynyl radicals; aryl radicals such as the phenyl, naphthyl, anthryl and phenanthryl radicals; alkaryl radicals such as o-, m-, p-tolyl radicals, xylyl radicals and ethylphenyl radicals; and aralkyl radicals such as the benzyl radical, and the α- and the β-phenylethyl radicals.

Examples of hydrocarbon radicals R' are alkyl radicals, such as the methyl and ethyl radicals.

Preferred examples of radicals A are radicals of the formulae

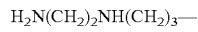

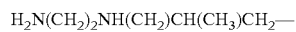

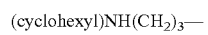

CH₃NH(CH₂)₃—

(CH₃)₂N(CH₂)₃—

CH₃CH₂NH(CH₂)₃—

(CH₃CH₂)₂N(CH₂)₃—

CH₃NH(CH₂)₂NH(CH₂)₃—

(CH₃)₂N(CH₂)₂NH(CH₂)₃—

CH₃CH₂NH(CH₂)₂NH(CH₂)₃—

(CH₃CH₂)₂N(CH₂)₂NH(CH₂)₃— and partially acetylated forms thereof.

Particularly preferred examples of radicals A are radicals of the formulae

H₂N(CH₂)₃—

H₂N(CH₂)₂NH(CH₂)₃—

H₂N(CH₂)₂NH(CH₂)CH(CH₃)CH₂—

(cyclohexyl)NH(CH₂)₃—

(acetyl)-NH(CH₂)₂NH(CH₂)₃—

H₂N(CH₂)₂N(acetyl)(CH₂)₃—

The organopolysiloxanes (1) preferably have a viscosity of from 5 to 50,000 mPa.s at 25° C., preferably of from 100 to 10,000 mPa.s at 25° C., and preferably have an amine content of from 0.05 to 2.0 mEquiv/g, preferably 0.1 to 0.8 mEquiv/g, which corresponds to an amine number of preferably from 0.05 to 2.0, more preferably 0.1 to 0.8.

Preferably, the radical X in the isocyanates (2) is a radical of the formula selected from the group of the formulae CH₃C₆H₄SO₂, C₆H₅SO₂, CH₃SO₂, CCl₃SO₂ and ClSO₂, where the radical of the formula CH₃C₆H₄SO₂— (tosyl radical) is preferred.

Examples of isocyanates (2) are therefore p-toluenesulfonyl isocyanate benzenesulfonyl isocyanate, trichloroacetyl isocyanate methanesulfonyl isocyanate and chlorosulfonyl isocyanate, where p-toluenesulfonyl isocyanate is preferred.

The reaction of (1) with (2) in the first method step takes place in the presence of acidic or basic moderators (3). Preferably, the moderators are monofunctional acids or bases.

Examples of acidic moderators (3) are carboxylic acids, preferably monofunctional carboxylic acids such as formic acid, acetic acid, propionic acid, butyric acid, 2-methylhexanoic acid, and octanoic acid; fatty acids such as perlargonic acid, lauric acid, myristic acid, palmitic acid, stearic acid, behenic acid, oleic acid, linoleic acid; benzoic acid; lactic acid; sulfonic acids such as methanesulfonic acid, ethanesulfonic acid, benzenesulfonic acid, and toluenesulfonic acid; mineral acids such as nitric acid, hydrochloric acid, hydrobromic acid, and hydroiodic acid. Preference is given to acids with a molar mass not higher than 150 Da, in particular not higher than 80 Da.

Examples of basic moderators (3) are tertiary amines such as trimethylamine, triethylamine, tripropylamine, tributylamine, dimethylethylamine, dimethylisopropylamine, diethylisopropylamine, dimethylcyclohexylamine, diethylbutylamine, triisooctylamine and methylmorpholine.

The first step of the method according to the invention is preferably carried out at a temperature of from 0 to 100° C., more preferably at 10 to 60° C., and preferably takes place at the pressure of the ambient atmosphere, i.e. at ca. 1020 hPa, but can also be carried out at higher or lower pressures.

The reaction of (1) with (2) in the first method step gives organopolysiloxanes which contain primary and/or secondary amino groups (—NH—) and acidic groups of the formula X—NH—CO—N═, where X is an electron-withdrawing group, preferably a tosyl group in the formula CH₃C₆H₄SO₂—, i.e. the amino groups here are partially converted to acidic carbamidosulfone groups, and residual basic amino groups remain.

The organopolysiloxanes (1) used in the first method step preferably have Si—C bonded amino groups A of the formula (I) which, where g=1, are diamine groups and, where g=2, are triamino groups. When reacting these amino groups with isocyanates (2), the N atoms can be completely or partially converted to diamine or triamino groups. If they are only partly reacted, in this way, in the first method step, organopolysiloxanes can be formed which contain acidic and basic groups even in one and the same Si—C bonded substituent and not just in a molecule.

The organopolysiloxanes (1) can additionally also have tertiary amino groups, but these do not react with the isocyanates (2) and are thus retained as basic groups.

The acidic or basic moderators (3) can be removed from the (4a) reaction products from (1) and (2) obtained in the first method step, where (4b) organopolysiloxanes that are liquid at 25° C. and 1020 hPa and have a viscosity of from 100 to 1,000,000 Pa.s (25° C.) or elastomer-like organopolysiloxanes are obtained, where the organopolysiloxanes have, as basic groups, primary and/or secondary amino groups (—NH—) and, as acidic groups, those of the formula X—NH—CO—N═, where X is an electron-withdrawing group.

The removal of the moderators (3), in particular of the carboxylic acids, such as acetic acid, preferably takes place by heating at a temperature of from 30 to 60° C. and/or by allowing the (4a) reaction products of (1) and (2) to dry out in the first method step. In a thin layer or else otherwise over a prolonged period, simple flashing off likewise leads to highly viscous organopolysiloxanes. A considerable increase in viscosity can also arise as a result of moderators (3), preferably hydrophilic moderators (3), migrating out of the emulsified droplets into the water phase.

The organopolysiloxanes (4b) that are liquid at 25° C. and 1020 hPa preferably have a viscosity of from 100 to 100,000 mPa.s at 25° C., preferably 100 to 10,000 mPa.s at 25° C.

The ratio of the viscosities of the organopolysiloxanes (1) used to the organopolysiloxanes (4b) obtained is preferably greater than 20, preferably greater than 50, in particular greater than 100 and particularly preferably greater than 200.

Besides liquid organopolysiloxanes (4b), elastomer-like organopolysiloxanes are also obtained, although the viscosity thereof can no longer be measured.

The invention therefore provides organopolysiloxanes (4b) having, as basic groups, primary and/or secondary amino groups (—NH—) and, as acidic groups, those of the formula X—NH—CO—N═, where X is an electron-withdrawing group, where the organopolysiloxanes are organopolysiloxanes that are liquid at 25° C. and 1020 hPa and have a viscosity of from 100 Pa.s to 1,000,000 Pa.s (25° C.) or elastomer-like organopolysiloxanes.

Preferably, the molar ratio of acidic groups to basic groups is 0.01 to 100, preferably 0.1 to 10, preferably 0.2 to 5, particularly preferably 0.2 to 2.

Preferably, the organopolysiloxanes (4b) are those of the formula

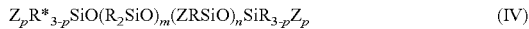   (IV)

where

Z is an acidic group Y of the formula

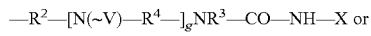

a basic group A of the formula

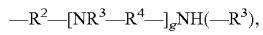,

V is $R^3$ or a radical of the formula —CO—NH—X,

X is an electron-withdrawing group,

R* is R or a radical of the formula —OR',

R is a monovalent hydrocarbon radical having 1 to 18 carbon atoms,

R' is a hydrogen atom or a monovalent hydrocarbon radical having 1 to 18 carbon atoms, preferably a $C_1$-$C_4$-alkyl radical, $R^2$ is a divalent linear or branched hydrocarbon radical having 1 to 18 carbon atoms, $R^3$ is a hydrogen atom or a monovalent hydrocarbon radical having 1 to 18 carbon atoms, preferably a $C_1$-$C_4$-alkyl radical, or an acyl radical, preferably a hydrogen atom, $R^4$ is a divalent hydrocarbon radical having 1 to 6 carbon atoms, g is 0, 1, 2, 3 or 4, preferably 0, 1 or 2, preferably 1 or 2, p is 0 or 1, m is an integer from 1 to 1000, preferably 10 to 500, preferably 20 to 400, and n is 0 or an integer from 1 to 50, preferably 1 to 20, preferably 1 to 10, with the proviso that the molar ratio of acidic groups Y to basic groups A is 0.01 to 100, preferably 0.1 to 10, more preferably 0.2 to 5, and that the organopolysiloxanes contain at least two groups Z, at least one group Y and at least one group A per molecule.

Preferably,

Y is a group of the formula

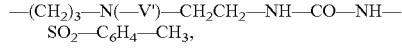

where V' is a hydrogen atom or a radical of the formula

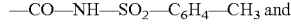 and

A is a group of the formula

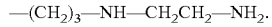.

In the second method step, the organopolysiloxanes obtained from the first method step as (4a) reaction products from (1) and (2) which have acidic or basic moderators (3) are preferably emulsified with emulsifiers (5) and preferably with organic solvents (6) in water (7).

The production of the emulsions according to the invention takes place by mixing, preferably intensive mixing of the components (4a), (5), (6) and (7).

Technologies for producing emulsions of organopolysiloxanes are known. Thus, the intensive mixing can take place in rotor-stator stirring devices, colloid mills or in high-pressure homogenizers.

Emulsifiers (5) which can be used are all cationic, anionic and nonionic emulsifiers known hitherto, either individually or as mixtures of different emulsifiers, with which also hitherto aqueous emulsions of organopolysiloxanes were able to be produced.

Suitable anionic emulsifiers are in particular:

1. Alkyl sulfates, particularly those with a chain length of from 8 to 18 carbon atoms, alkyl and alkaryl ether sulfates having 8 to 18 carbon atoms in the hydrophobic radical and 1 to 40 ethylene oxide (EO) and/or propylene oxide (PO) units.

2. Sulfonates, particularly alkylsulfonates having 8 to 18 carbon atoms, alkylarylsulfonates having 8 to 18 carbon atoms, taurides, esters and half-esters of sulfosuccinic acid with monohydric alcohols or alkylphenyls having 4 to 15 carbon atoms; optionally, these alcohols or alkylphenyls can also be ethoxylated with 1 to 40 EO units.

3. Alkali metal and ammonium salts of carboxylic acids having 8 to 20 carbon atoms in the alkyl, aryl, alkaryl or aralkyl radicals.

4. Phosphoric acid part esters and alkali metal and ammonium salts thereof, particularly alkyl and alkaryl phosphates having 8 to 20 carbon atoms in the organic radical, alkyl ether and alkaryl ether phosphates having 8 to 20 carbon atoms in the alkyl or alkaryl radical and 1 to 40 EO units.

Suitable nonionic emulsifiers are in particular:

5. Polyvinyl alcohol which also has 5 to 50%, preferably 8 to 20%, vinyl acetate units, with a degree of polymerization from 500 to 3000.

6. Alkyl polyglycol ethers, preferably those having 8 to 40 EO units and alkyl radicals from 8 to 20 carbon atoms.

7. Alkylaryl polyglycol ethers, preferably those having 8 to 40 EO units and 8 to 20 carbon atoms in the alkyl and aryl radicals.

8. Ethylene oxide/propylene oxide (EO/PO) block copolymers, preferably those having 8 to 40 EO and/or PO units.

9. Addition products of alkylamines with alkyl radicals from 8 to 22 carbon atoms with ethylene oxide or propylene oxide.

10. Fatty acids having 6 to 24 carbon atoms.

11. Alkyl polyglycosides of the general formula R*—O—$Z_o$, in which R* is a linear or branched, saturated or unsaturated alkyl radical having on average 8-24 carbon atoms and $Z_o$ is an oligoglycoside radical having on average o=1-10 hexose or pentose units or mixtures thereof.

12. Natural substances and derivatives thereof, such as lecithin, lanolin, saponins, cellulose; cellulose alkyl ethers and carboxyalkylcelluloses, the alkyl groups of which in each case have up to 4 carbon atoms.

13. Linear organo(poly)siloxanes containing polar groups, in particular those with alkoxy groups having up to 24 carbon atoms and/or up to 40 EO and/or PO groups.

Suitable cationic emulsifiers are in particular:

14. Salts of primary, secondary and tertiary fatty amines having 8 to 24 carbon atoms with acetic acid, sulfuric acid, hydrochloric acid and phosphoric acids.

15. Quaternary alkyl- and alkylbenzene ammonium salts, in particular those whose alkyl groups have 6 to 24 carbon atoms, in particular the halides, sulfates, phosphates and acetates.

16. Alkylpyridinium, alkylimidozolinium and alkyloxazolinium salts, in particular those whose alkyl chain has up to 18 carbon atoms, specifically the halides, sulfates, phosphates and acetates.

Suitable ampholytic emulsifiers are in particular:

17. Long-chain-substituted amino acids, such as N-alkyldi(aminoethyl)glycine or N-alkyl-2-aminopropionic acid salts.

18. Betaines, such as N-(3-acylamidopropyl)-N,N-di-methylammonium salts with a $C_8$-$C_{18}$-acyl radical and alkylimidozolinium betaines.

Preferred emulsifiers are nonionic emulsifiers, in particular the alkyl polyglycol ethers listed above under 6, the addition products of alkylamines with ethylene oxide or propylene oxide listed under 9, the alkyl polyglycosides listed under 11, and the polyvinyl alcohol listed under 5.

For the emulsions according to the invention, emulsifiers (5) are preferably used in amounts of 0 to 30 parts by weight, more preferably 5 to 20 parts by weight, in each case based on 100 parts by weight of reaction products (4a).

Examples of organic solvents (6) of saturated hydrocarbons such as n-pentane, n-hexane, n-heptane and n-octane, and branched isomers thereof, benzines, e.g. alkane mixtures with a boiling range from 80° C. to 140° C. at 1020 hPa; unsaturated hydrocarbons such as 1-hexene, 1-heptene, 1-octene and 1-decene; aromatic hydrocarbons such as benzene, toluene and xylenes; halogenated alkanes having 1 to 6 carbon atom(s) such as methylene chloride, trichloroethylene and perchloroethylene; ethers such as di-n-butyl ether; esters such as ethylene acetate; ketones such as methyl ethyl ketone and cyclohexanone, alcohols, such as methanol, ethanol, n-propanol and isopropanol; and glycols such as ethylene glycol and diethylene glycol; and glycol ethers such as diethylene glycol monobutyl ether (butyl diglycol); and also silicone oils such as trimethylsilyl-capped dimethylpolysiloxanes, with a viscosity of from 0.65 to 100 mPa.s at 25° C.

For the emulsions according to the invention, organic solvents (6) are preferably used in amounts of 0 to 100 parts by weight, more preferably 5 to 30 parts by weight, in each case based on 100 parts by weight of reaction products (4a).

In the emulsions according to the invention, water (7) is preferably used in amounts of 80 to 400 parts by weight, more preferably 100 to 400 parts by weight, in each case based on 100 parts by weight of reaction products (4a).

The second step of the method according to the invention, the emulsification, is preferably carried out at a temperature of from 10 to 70° C., more preferably at 20 to 50° C., and preferably takes place at the pressure of the ambient atmosphere, i.e. at ca. 1020 hPa, but can also be carried out at higher or lower pressures.

The method according to the invention has the advantage that, as a result of the partial reaction of the basic amino groups (—NH—) with isocyanates X—N=C=O, where X is an electron-withdrawing group X, in the first method step organopolysiloxanes are obtained which simultaneously contain residual basic groups and also acidic groups. If X, as preferred, is a tosyl group $CH_3C_6H_2SO_2$—, a tosylurea group is formed which, on account of the strong electron attraction of carbonyl and sulfonyl group, develops acidic properties (similar to a carboxylic acid). In this way, organopolysiloxanes are produced which have strong ionic interactions. Highly viscous to elastomer-like organopolysiloxanes are obtained here as a result of exclusively multiple ionic interactions of these organopolysiloxanes which contain, on average, one or more basic and acidic groups, and these are attracted electrostatically. Highly viscous organopolysiloxanes, however, have the disadvantage that they can no longer be emulsified.

An addition of moderators, preferably carboxylic acids, such as acetic acid, during this partial reaction in the first method step surprisingly prevents or reduces this viscosity increase to a sufficiently great extent such that the siloxanes according to the invention having acidic and basic groups are easy to emulsify. Upon removing these moderators, for example by flashing off or washing out, on the other hand, high viscosity to elastomer-like organopolysiloxanes are formed. The method according to the invention therefore has the further advantage that as a result of adding moderators, preferably carboxylic acids, the organopolysiloxanes can be emulsified and, in this way, emulsions of high viscosity organopolysiloxanes or elastomer-like organopolysiloxanes to which no viscosity can be attributed, are obtained.

In reverse sequence, the organopolysiloxanes according to the invention offer the advantage that substances which interfere in this polyionic interaction can also again lead to the reduction in the viscosity of these substances, as a result of which applied high viscosity polymers become more mobile again and can be detached. This can be achieved by means of suitable washing solutions or emulsions, which offers the option of avoiding undesired accumulations on surfaces.

The inventive emulsions of organopolysiloxanes which contain acidic and basic groups can in principle be used in applications in which high viscosity siloxanes, particularly aminosiloxanes, offer advantages, thus for example in formulations of hair care compositions and shampoos, polishes, coating care compositions, fabric softeners, and quite generally for treating surfaces.

EXAMPLE 1

125 g of an aminosiloxane consisting of 3-(2-amino-ethyl) aminopropylmethylsiloxane, dimethylsiloxane and trimethylsiloxane units with a viscosity of 1600 mPa.s (25° C.) and an amine value of 0.148 are admixed at 24.2° C. with 7.8 g of acetic acid. Then, 1.46 g of p-toluenesulfonyl isocyanate (TI) are mixed in and the mixture is stirred until a temperature increase of 4.6° K is reached after ca. 5 minutes. The amount of p-toluenesulfonyl isocyanate (TI) suffices to convert 40 mol % of all amino groups into acidic sulfonylurea groups.

The mixture is heated for a further hour at 45° C. and then a sample of a few grams is left to dry out on a glass plate, during which time the polymer viscosity increases considerably. After 3 days, a viscosity of 1200 Pa.s is measured at 25° C. The aminosiloxane partially reacted with 1.17% of its mass with p-toluenesulfonyl isocyanate (TI) has multiplied its viscosity 750 times.

68 g of the partially reacted aminosiloxane, diluted with acetic acid, is used together with a mixture of 22 g of isotridecyl pentaethoxylate (emulsifier (5) and 10 g of butyl diglycol and in total 100 g of water to produce, without problems and without the use of high shear forces, a transparent finely divided emulsion which comprises ca. 34% by weight of polymer.

This emulsifying process cannot be carried out with the acetic-acid-free highly viscous polymer (with 1200 Pa.s at 25° C.)

EXAMPLE 2

125 g of the aminosiloxane described in example 1 with an identical amine value but a viscosity of 2700 mPa.s (25° C.) is reacted with the same amounts of acetic acid and p-toluenesulfonyl isocyanate as in example 1. After flashing off the acetic acid moderator, a viscosity of 2300 Pa.s (25° C.) can ultimately be measured.

As in example 1, however, the mixture obtained above of partially reacted (40 mol % of all amino groups) aminosiloxane and acetic acid can be emulsified without problems to give a finely divided emulsion.

This emulsifying process cannot however be carried out with the acetic-acid-free highly viscous polymer.

EXAMPLE 3

125 g of an aminosiloxane constructed as in example 1 but with an amine value of 0.120 and a viscosity of 8900 mPa.s (25° C.) are admixed at 23.7° C. with only 2.7 g of acetic acid.

Then, 1.19 g of p-toluenesulfonyl isocyanate (TI) are stirred into this mixture, during which time the temperature of the reaction mixture increases further. The mixture is heated at 45° C. for a further hour. At the end of the reaction, 40 mol % of all amino groups of the aminosiloxane used have been converted into acidic sulfonylurea groups.

A sample of a few grams of this product, dried out as in example 1, achieves a viscosity of 16,100 Pa.s at 25° C. The aminosiloxane derivatized with less than 1% by weight of its mass on TI has thus achieved 1800 times its original viscosity.

As in example 1, 68 g of this product are emulsified in the same way without problems without a considerable increase in viscosity taking place during the emulsifying process. This cannot be carried out with the acetic-acid-free highly viscous polymer.

EXAMPLE 4

125 g of an aminosiloxane as described in example 1 but with an amine value of 0.15 and a viscosity of 3650 mPa.s (25° C.) are mixed at 24.4° C. with 3.4 g of acetic acid and homogenized. After increasing the temperature slightly, 0.74 g of p-toluenesulfonyl isocyanate (TI) are stirred in and the mixture is heated at 45° C. for one hour. The amount of TI suffices only to convert 20 mol % of the amino groups of the siloxane. A dried sample still achieves a viscosity of 747 Pa.s at 25° C. and thus a value 200 times the original value.

EXAMPLE 5

125 g of an aminosiloxane of 3-(2-aminoethyl)aminopropylmethylsiloxane and dimethylsiloxane units with methoxy and hydroxy end groups, an amine value of 0.134 and a viscosity of 4300 mPa.s at 25° C. are admixed at room temperature with 7.0 g of acetic acid and then reacted with 0.99 g of p-toluenesulfonyl isocyanate, after which the mixture is left to fully react at 45° C. for one hour.

The acetic moderator is allowed to flash off from a few grams of this reaction mixture in a flat glass dish. An elastomer-like clear product is obtained, the viscosity of which can no longer be measured.

As in example 1, however, the mixture of partially reacted (30 mol % of all amino groups) aminosiloxane and acetic acid can be emulsified without problems.

This emulsifying process cannot however be carried out with the acetic-acid-free elastomer-like polymer.

The invention claimed is:

1. A method for producing emulsions of organopolysiloxanes having basic and acidic groups, comprising:
in a first step,
reacting organopolysiloxanes (1) having primary and/or secondary amino groups (—NH—)
with isocyanates (2) of the formula X—N=C=O,
where X is an electron-withdrawing group selected from the group of the formulae $CH_3C_6H_4SO_2$—, $C_6H_5SO_2$—, $CH_3SO_2$—, $CCl_3SO_2$—, $ClSO_2$—, and mixtures thereof,
in the presence of at least one acidic moderator (3) selected from the group consisting of carboxylic acids or at least one basic moderator (3) selected from the group consisting of tertiary amines,
with the proviso that
0.01-0.9 mol of isocyanate groups in (2) are present per mole of amino group (—NH—) in (1)
and that
0.1-10 mol of acidic moderator(s) (3) are used per mole of amino group (—NH—) in (1) or 0.1-10 mol of basic moderator(s) (3) are used per mole of amino group (—NH—) in (1),
to produce reaction products (4a),
and, in a second step:
emulsifying the reaction products (4a) obtained in the first step which contain acidic or basic moderators (3), in water (7), optionally with emulsifiers (5) and optionally organic solvents (6) to form an aqueous emulsion (4b),
where emulsions (4b) of organopolysiloxanes that are liquid at 25° C. and 1020 hPa and have a viscosity of from 100 Pa.s to 1,000,000 Pa.s (25° C.) or are elastomeric organopolysiloxanes are obtained, and where the organopolysiloxanes have, as basic groups, primary and/or secondary amino groups (—NH—) and, as acidic groups, groups of the formula X—NH—CO—N=.

2. The method of claim 1, wherein from 0.1 to 0.8 mol of isocyanate groups are present per mol of amino groups in (1).

3. The method of claim 1, wherein from 0.5 to 0.8 mol of isocyanate groups are present per mol of amino groups in (1).

4. A method for producing organopolysiloxanes having basic and acidic groups comprising:
in a first step:
reacting organopolysiloxanes (1) having primary and/or secondary amino groups (—NH—) with isocyanates (2) of the formula X—N=C=O,
where X is an electron-withdrawing group selected from the group of the formulae $CH_3C_6H_4SO_2$—, $C_6H_5SO_2$—, $CH_3SO_2$—, $CCl_3SO_2$— and $ClSO_2$—, and mixtures thereof
in the presence of at least one acidic moderator (3) selected from the group consisting of carboxylic acids or at least one basic moderator (3) selected from the group consisting of tertiary amines,
with the proviso that
0.01-0.9 mol of isocyanate group in (2) are used per mole of amino group (—NH—) in (1) and that
0.1-10 mol of acidic moderator(s) (3) are used per mole of amino group in (1) or 0.1-10 mol of basic moderator(s) (3) are used per mole of amino group (—NH—) in (1),
where, as reaction products (4a) from (1) and (2), organopolysiloxanes are obtained which have, as basic groups, primary and/or secondary amino groups (—NH—) and, as acidic groups, those of the formula X—NH—CO—N=, and which contain acidic or basic moderators (3).

5. The method of claim 4, wherein from 0.1 to 0.8 mol of isocyanate groups are present per mol of amino groups in (1).

6. The method of claim 4, wherein from 0.5 to 0.8 mol of isocyanate groups are present per mol of amino groups in (1).

7. The method of claim 1, wherein the primary and/or secondary amino groups in the organopolysiloxanes (1) are Si—C bonded groups A of the formula $$—R^2—[NR^3—R^4—]_g NHR^3 \qquad (I)$$

where
$R^2$ is a divalent linear or branched hydrocarbon radical having 1 to 18 carbon atoms,
$R^3$ is a hydrogen atom or a monovalent hydrocarbon radical having 1 to 18 carbon atoms, or an acyl radical,
$R^4$ is a divalent hydrocarbon radical having 1 to 6 carbon atoms, and
g is 0, 1, 2, 3 or 4, preferably 0, 1 or 2.

8. The method of claim 1, wherein the primary and/or secondary amino groups in the organopolysiloxanes (1) are Si—C bonded groups A of the formula $$-R^2-[NR^3-R^4-]_g NHR^3 \qquad (I)$$

where
$R^2$ is a divalent linear or branched hydrocarbon radical having 1 to 18 carbon atoms,
$R^3$ is a $C_{1-4}$ alkyl radical,
$R^4$ is a divalent hydrocarbon radical having 1 to 6 carbon atoms, and
g is 0, 1, 2, 3 or 4, preferably 0, 1 or 2.

9. The method of claim 1, wherein the primary and/or secondary amino groups in the organopolysiloxanes (1) are Si—C bonded groups A of the formula $$-R^2-[NR^3-R^4-]_g NHR^3 \qquad (I)$$

where
$R^2$ is a divalent linear or branched hydrocarbon radical having 1 to 18 carbon atoms,
$R^3$ is a hydrogen atom,
$R^4$ is a divalent hydrocarbon radical having 1 to 6 carbon atoms, and
g is 0, 1, 2, 3 or 4, preferably 0, 1 or 2.

10. The method of claim 2, wherein the primary and/or secondary amino groups in the organopolysiloxanes (1) are Si—C bonded groups A of the formula $$-R^2-[NR^3-R^4-]_g NHR^3 \qquad (I)$$

where
$R^2$ is a divalent linear or branched hydrocarbon radical having 1 to 18 carbon atoms,
$R^3$ is a hydrogen atom or a monovalent hydrocarbon radical having 1 to 18 carbon atoms, or an acyl radical,
$R^4$ is a divalent hydrocarbon radical having 1 to 6 carbon atoms, and
g is 0, 1, 2, 3 or 4, preferably 0, 1 or 2.

11. The method of claim 2, wherein the primary and/or secondary amino groups in the organopolysiloxanes (1) are Si—C bonded groups A of the formula $$-R^2-[NR^3-R^4-]_g NHR^3 \qquad (I)$$

where
$R^2$ is a divalent linear or branched hydrocarbon radical having 1 to 18 carbon atoms,
$R^3$ is a $C_{1-4}$ alkyl radical,
$R^4$ is a divalent hydrocarbon radical having 1 to 6 carbon atoms, and
g is 0, 1, 2, 3 or 4, preferably 0, 1 or 2.

12. The method of claim 2, wherein the primary and/or secondary amino groups in the organopolysiloxanes (1) are Si—C bonded groups A of the formula $$-R^2-[NR^3-R^4-]_g NHR^3 \qquad (I)$$

where
$R^2$ is a divalent linear or branched hydrocarbon radical having 1 to 18 carbon atoms,
$R^3$ is a hydrogen atom,
$R^4$ is a divalent hydrocarbon radical having 1 to 6 carbon atoms, and
g is 0, 1, 2, 3 or 4, preferably 0, 1 or 2.

13. The method of claim 1, wherein the organopolysiloxanes (1) has the formula $$A_k R^*_{3-k} SiO(R_2 SiO)_m (AR^* SiO)_n SiR^*_{3-k} A_k \qquad (III)$$

where
A are Si—C bonded groups of the formula $$-R^2-[NR^3-R^4-]_g NHR^3 \qquad (I)$$

where
$R^2$ is a divalent linear or branched hydrocarbon radical having 1 to 18 carbon atoms,
$R^3$ is a hydrogen atom or a monovalent hydrocarbon radical having 1 to 18 carbon atoms, or an acyl radical,
$R^4$ is a divalent hydrocarbon radical having 1 to 6 carbon atoms, and
g is 0, 1, 2, 3 or 4, preferably 0, 1 or 2,
$R^*$ is R or a radical of the formula —OR',
R is a monovalent hydrocarbon radical having 1 to 18 carbon atoms,
R' is a hydrogen atom or a monovalent hydrocarbon radical having 1 to 18 carbon atoms,
k is 0 or 1,
m is an integer from 1 to 1000, and
n is 0 or an integer from 1 to 50,
with the proviso that the organopolysiloxanes contain at least one radical A per molecule.

14. The method of claim 1, wherein the organopolysiloxanes (1) has the formula $$A_k R^*_{3-k} SiO(R_2 SiO)_m (AR^* SiO)_n SiR^*_{3-k} A_k \qquad (III)$$

where
A are Si—C bonded groups of the formula $$-R^2-[NR^3-R^4-]_g NHR^3 \qquad (I)$$

where
$R^2$ is a divalent linear or branched hydrocarbon radical having 1 to 18 carbon atoms,
$R^3$ is a hydrogen atom or a monovalent hydrocarbon radical having 1 to 18 carbon atoms, or an acyl radical,
$R^4$ is a divalent hydrocarbon radical having 1 to 6 carbon atoms, and
g is 0, 1, 2, 3 or 4, preferably 0, 1 or 2,
$R^*$ is R or a radical of the formula —OR',
R is a monovalent hydrocarbon radical having 1 to 18 carbon atoms,
R' is a hydrogen atom or a monovalent hydrocarbon radical having 1 to 18 carbon atoms,
k is 0 or 1,
m is an integer from 10 to 500, and
n is 0 or an integer from 1 to 20,
with the proviso that the organopolysiloxanes contain at least one radical A per molecule.

15. The method of claim 2, wherein the organopolysiloxanes (1) has the formula $$A_k R^*_{3-k} SiO(R_2 SiO)_m (AR^* SiO)_n SiR^*_{3-k} A_k \qquad (III)$$

where
A are Si—C bonded groups of the formula $$-R^2-[NR^3-R^4-]_g NHR^3 \qquad (I)$$

where
$R^2$ is a divalent linear or branched hydrocarbon radical having 1 to 18 carbon atoms,
$R^3$ is a hydrogen atom or a monovalent hydrocarbon radical having 1 to 18 carbon atoms, or an acyl radical,
$R^4$ is a divalent hydrocarbon radical having 1 to 6 carbon atoms, and
g is 0, 1, 2, 3 or 4, preferably 0, 1 or 2,
$R^*$ is R or a radical of the formula —OR',
R is a monovalent hydrocarbon radical having 1 to 18 carbon atoms, R' is a hydrogen atom or a monovalent hydrocarbon radical having 1 to 18 carbon atoms, k is 0 or 1, m is an integer from 1 to 1000, and n is 0 or an integer from 1 to 50, the proviso that the organopolysiloxanes contain at least one radical A per molecule.

16. The method of claim 2, wherein the organopolysiloxanes (1) has the formula $$A_kR^*{}_{3-k}SiO(R_2SiO)_m(AR^*SiO)_nSiR^*{}_{3-k}A_k \qquad (III)$$

where

A are Si—C bonded groups of the formula $$-R^2-[NR^3-R^4-]_gNHR^3 \qquad (I)$$

where $R^2$ is a divalent linear or branched hydrocarbon radical having 1 to 18 carbon atoms, $R^3$ is a hydrogen atom or a monovalent hydrocarbon radical having 1 to 18 carbon atoms, or an acyl radical, $R^4$ is a divalent hydrocarbon radical having 1 to 6 carbon atoms, and g is 0, 1, 2, 3 or 4, preferably 0, 1 or 2, R* is R or a radical of the formula —OR', R is a monovalent hydrocarbon radical having 1 to 18 carbon atoms, R' is a hydrogen atom or a monovalent hydrocarbon radical having 1 to 18 carbon atoms, k is 0 or 1, m is an integer from 10 to 500, and n is 0 or an integer from 1 to 20, with the proviso that the organopolysiloxanes contain at least one radical A per molecule.

17. The method of claim 1, wherein the acidic or basic moderators (3) are removed from the (4a) reaction products from (1) and (2) obtained in the first step, where organopolysiloxanes (4b) that are liquid at 25° C. and 1020 hPa and have a viscosity of from 100 to 1,000,000 Pa.s (25° C.) or are elastomeric organopolysiloxanes are obtained, where the organopolysiloxanes have, as basic groups, primary and/or secondary amino groups (—NH—) and, as acidic groups, those of the formula X—NH—CO—N=.

18. The method of claim 2, wherein the acidic or basic moderators (3) are removed from the (4a) reaction products from (1) and (2) obtained in the first step, where organopolysiloxanes (4b) that are liquid at 25° C. and 1020 hPa and have a viscosity of from 100 to 1,000,000 Pa.s (25° C.) or are elastomeric organopolysiloxanes are obtained, where the organopolysiloxanes have, as basic groups, primary and/or secondary amino groups (—NH—) and, as acidic groups, those of the formula X—NH—CO—N=.

19. The method of claim 3, wherein the acidic or basic moderators (3) are removed from the (4a) reaction products from (1) and (2) obtained in the first step, where organopolysiloxanes (4b) that are liquid at 25° C. and 1020 hPa and have a viscosity of from 100 to 1,000,000 Pa.s (25° C.) or are elastomer-like organopolysiloxanes are obtained, where the organopolysiloxanes have, as basic groups, primary and/or secondary amino groups (—NH—) and, as acidic groups, those of the formula X—NH—CO—N=.

20. An emulsion of organopolysiloxanes having basic and acidic groups prepared by the process of claim 1.

21. An organopolysiloxane having basic and acidic groups, prepared by the process of claim 4.

22. An organopolysiloxane having, as basic groups, primary and/or secondary amino groups (—NH—) and, as acidic groups, those of the formula X—NH—CO—N=, where X is an electron-withdrawing group selected from the group consisting of the formulae $CH_3C_6H_4SO_2$—, $C_6H_5SO_2$—, $CH_3SO_2$—, $CCl_3SO_2$— and $ClSO_2$—, where the organopolysiloxane is an organopolysiloxane that is liquid at 25° C. and 1020 hPa and has a viscosity of from 100 Pa.s to 1,000,000 Pa.s (25° C.) or is an elastomeric organopolysiloxane.

23. The organopolysiloxane of claim 22, having the formula $$Z_pR^*{}_{3-p}SiO(R_2SiO)_m(ZR^*SiO)_nSiR^*{}_{3-p}Z_p \qquad (IV)$$

where

Z is an acidic group Y of the formula $$-R^2-[N(-V)-R^4]_gNR^3-CO-NH-X \text{ or}$$

a basic group A of the formula $$-R^2-[NR^3-R^4]_gNH(-R^3),$$

V is $R^3$ or a radical of the formula —CO—NH—X,

X is an electron-withdrawing group selected from the group consisting of the formulae $CH_3C_6H_4SO_2$—, $C_6H_5SO_2$—, $CH_3SO_2$—, $CCl_3SO_2$— and $ClSO_2$—, R* is R or a radical of the formula —OR', R is a monovalent hydrocarbon radical having 1 to 18 carbon atoms, R' is a hydrogen atom or a monovalent hydrocarbon radical having 1 to 18 carbon atoms, $R^2$ is a divalent linear or branched hydrocarbon radical having 1 to 18 carbon atoms, $R^3$ is a hydrogen atom, a monovalent hydrocarbon radical having 1 to 18 carbon atoms, or an acyl radical, $R^4$ is a divalent hydrocarbon radical having 1 to 6 carbon atoms, g is 0, 1, 2, 3 or 4, p is 0 or 1, m is an integer from 1 to 1000, and n is 0 or an integer from 1 to 50, with the proviso that the molar ratio of acidic groups Y to basic groups A is 0.01 to 100, and that the organopolysiloxane contains at least two groups Z, at least one group Y and at least one group A per molecule.

24. The organopolysiloxane of claim 23, wherein

Y is a group of the formula $$-(CH_2)_3-N(-V)-CH_2CH_2-NH-CO-NH-SO_2-C_6H_4-CH_3,$$

where V' is a hydrogen atom or a radical of the formula $$-CO-NH-SO_2-C_6H_4-CH_3$$

and

A is a group of the formula $$-(CH_2)_3-NH-CH_2CH_2-NH_2.$$

* * * * *